TWO FREQUENCY REED DECODER AND SELECTIVE SIGNALLING DEVICE

Filed Dec. 20, 1967

INVENTOR:
WILLIAM G. MUSTAIN,
BY G. David Blumenfeld
HIS ATTORNEY.

United States Patent Office
3,555,512
Patented Jan. 12, 1971

3,555,512
TWO FREQUENCY REED DECODER AND SELECTIVE SIGNALLING DEVICE

William G. Mustain, Lynchburg, Va., assignor to General Electric Company, a corporation of New York Filed Dec. 20, 1967, Ser. No. 692,171
Int. Cl. H04q 9/12
U.S. Cl. 340—171 6 Claims

ABSTRACT OF THE DISCLOSURE

A selective signalling system uses two sequentially transmitted calling signals to actuate a receiver at the remote station to condition it to receive a message. A decoder in the receiver includes two networks, each containing a frequency-selective element responsive to one of the calling signal frequencies. The two networks are interconnected in such a manner as to minimize "falsing" due to noise simulating the calling frequencies. The first and second networks are interlocked so that the second network is operative to receive a calling signal for a limited time period after termination of the proper first calling signal. The second network is positively disabled by a biasing network which maintains a transistor switch in the second network in a nonconducting state. The appearance of the first signal disables the biasing network without enabling the second network. Upon termination of the first calling signal, the second network is conditioned to receive the second calling signal, and the biasing network remains inoperative or disabled for a fixed time-delay interval after the end of the first calling signal. If the calling signal of the second frequency is received during this time interval, the second network produces a control voltage which actuates the receiver and conditions it to receive the message being transmitted to it. Thus, the decoder is characterized by the fact that the second network is positively disabled at all times except the fixed time interval after the appearance and termination of the calling signal of the first frequency. This insures that the decoder is very reliable and not susceptible to falsing due to the appearance of a noise burst or the like simulating the second calling signal.

This invention relates to a selective calling system for remote stations such as two-way radios in mobile vehicles and, more particularly, to a highly reliable decoder for a selective calling system of the two-tone sequential type.

Signalling arrangements for establishing communication with one of a plurality of remote stations are well known. Typically, one such system contemplates transmitting a plurality of identifying or calling signals either directly over a telephone line or by modulating a carrier signal in the case of a radio system. The receiver is normally in a disabled state and is enabled to receive a message only if the proper sequence of calling signals is received at the beginning of the transmission. The decoder for enabling the receiver consists of a first frequency-sensitive tuned reed connected in series between a DC supply source and a capacitor. Receipt of the first proper calling signal drives the reed into vibration, establishing a conductive path between the power source and the capacitor, thereby charging the capacitor to a predetermined voltage level. A second frequency-sensitive tuned reed responsive to the second of the calling frequencies is connected between the capacitor and a further capacitor so that the appearance of the second calling frequency throws the second reed into vibration intermittently establishing contact between the first and second capacitors and causing the charge from the first capacitor to be transferred to the second capacitor. The voltage across capacitor is used to energize the receiver, enabling it to receive the message which follows. Such systems are subject to "falsing" in that the decoder circuitry in the receiver often activates the receiver even though the proper signal frequencies may not be received. One of the primary falsing modes is noise falsing. That is, if the first calling frequency is received to actuate the first reed and charge the first capacitor, the presence of electrical noise, either simultaneously or immediately thereafter, containing frequencies to which the second reed is tuned, produces a transfer of the charge from the first to the second capacitor enabling the receiver, even though the transmitted carrier does not actually contain both signalling frequencies for that particular receiver. Furthermore, shock and vibration, conditions to which radio receivers in vehicles are particularly susceptible, would often drive the second reed into vibration and transfer the charge from the first to the second capacitor, thereby actuating the receiver.

To avoid the falsing problems due to the presence of noise bursts which simulated the second frequency, it was suggested that a more complex signalling system be utilized in which four signalling frequencies were transmitted, two at a time. That is, a calling signal containing two different frequency components was transmitted, to be followed by another calling signal containing two additional frequencies, the theory being that the probabilities of the occurrence of a noise signal which contained frequency components which simulated the second pair of tone-signalling frequencies, was much reduced. These systems, a typical one of which is illustrated in Pat. No. 2,547,025, were effective to reduce the amount of falsing due to random noise bursts in the receiver; however, in solving this problem, another problem was introduced. By increasing the total number of frequencies contained in the calling signal transmitted to activate the receiver, obviously the number of tuned reeds in the decoder are increased correspondingly. Tuned reeds, however, are devices which are quite failure-prone, more so than any of the other devices, such as transistors, tubes, resistors and capacitors, etc., in the receiver. They are position-sensitive, respond strongly to shock and vibration, and, furthermore, since they are current-carrying devices, the reeds are often susceptible to contact burn and pitting. Thus, although the susceptibility of the system to noise falsing was reduced by providing two pairs of simultaneous calling frequencies, the reliability of the equipment was substantially reduced in that the number of the very sensitive reed elements was doubled. In addition, the complexity and cost of the calling signal transmitting devices are increased by using four, rather than two, calling signal frequencies. A need, therefore, exists for a decoder which is not susceptible to falsing due to noise, shock, or vibration and which, at the same time, is highly reliable in minimizing the number of tuned reed devices used.

It is, therefore, a primary objective of this invention to provide a selective calling system and decoder which is not susceptible to "noise falsing," while yet being highly reliable.

A further objective of this invention is to provide a selective calling system and decoder utilizing only two sequential calling frequencies, but which is not subject to noise or other falsing.

Other objectives and advantages of the invention will become apparent as the description thereof proceeds.

The various objectives and advantages of the invention are realized by providing a decoder for selectively enabling one of a plurality of remote stations in response to two sequential calling signals by providing two frequency-responsive networks, each including a tuned reed responsive to the specific calling signal frequency. Each reed is connected in series between a DC source and a capacitor so that the capacitor is charged up to a given voltage level upon receipt of the calling signals. To protect the system against falsing due to noise, etc., a disabling circuit is provided for the second frequency-responsive network to maintain an open circuit between the reed and the capacitor at all times except for a fixed interval after receipt of the first calling signal. Only during this interval is the second network enabled so that the appearance of a calling signal of the second frequency will produce the desired voltage across the capacitor in the circuit to enable the receiver. When the first calling signal is received, a switch circuit is actuated in response thereto, placing the disabling network in an inoperative state while still biasing the second network so as to maintain it in the disabled state. After termination of the first calling signal, the switch circuit which controls the disabling network is inactivated, removing the bias from the switch in the second network and conditioning it for the receipt of the second calling signal frequency. Simultaneously, the switch disabling network is returned to the operative state after a fixed time delay. It is during this fixed time delay interval after termination of the first calling signal that the second network is conditioned to actuate the receiver upon receipt of the second calling signal of the proper frequency. By positively disabling the second frequency-responsive network except for a fixed time interval after termination of the first calling signal, the decoder is not susceptible to noise or other falsing while, at the same time, reducing the number of highly sensitive reed elements required to minimize component failure.

The novel features which are believed to be characteristic of this invention are set forth with particularity in the appended claims. The invention, itself, both as to its organization and method of operation, together with further objectives and advantages thereof, may best be understood by reference to the following description taken in connection with the accompanying drawings in which:

Figure 1:
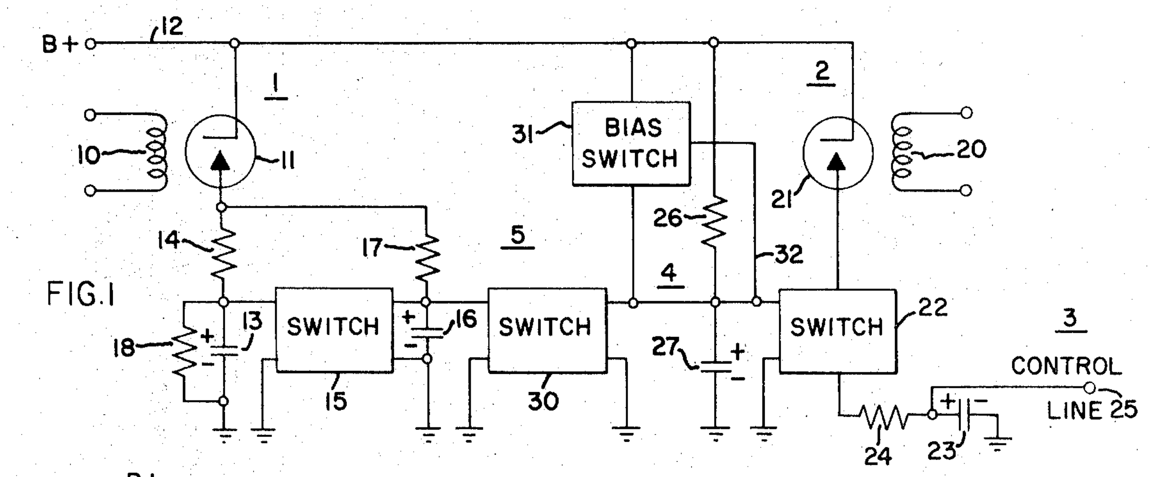
FIG. 1 is a partial block diagram of a decoder for a selective signalling system utilizing two sequential calling signal frequencies.

FIG. 1 illustrates, partially in block diagram form, a decoder for a receiver located at one of a plurality of remote stations which is responsive to a unique combination of two sequential calling signal frequencies to enable selective communication between a central base station and one of a number of remote vehicles or stations. The calling signals are transmitted over any suitable medium, either directly or as a modulated carrier and are received in a suitable receiver, not shown. The carrier is demodulated to extract calling signals which are then amplified, limited, and applied to drive coils 10 and 20 of a pair of frequency-sensitive tuned reeds 11 and 21. Reeds 11 and 21 are respectively connected in frequency-responsive networks 1 and 2, which produce first and second control potentials when the respective calling signals to which the reeds are tuned are received in the proper time sequence. Reed 11 in network 1 consists of an armature member which is so shaped and dimensioned that it vibrates only if driven by a signal of a predetermined frequency. When a signal of the proper frequency is impressed across winding 10, the armature is thrown into vibration and intermittently moves against a contact member to establish a conducting path between a source of DC voltage 12, the positive terminal of which is shown at B+, and storage capacitor 13. Capacitor 13 charges through charging resistor 14 and the voltage across capacitor 13 biases switch element 15 into the non-conducting (open) state. Switch 15, as will be described in detail later, provides a discharge path for a second capacitor 16, which is also connected to the voltage supply source B+ through reed 11 and a charging resistor 17. A resistor 18 is connected in shunt with first capacitor 13 and provides a discharge path for the charge across capacitor 13. Capacitor 16 also charges when reed 11 is energized by the first calling signal to produce a first control potential which affects the operation of the rest of the decoder.

The second frequency-responsive network includes, in addition to reed 21, a normally non-conducting (open) switch 22 connected in series with the reed, the source of supply voltage B+, charging resistor 24 and capacitor 23. Energization of reed 21 by the appearance of the second calling signal during the interval after the first calling signal has terminated, closes a conductive path between B+ and capacitor 23 so that capacitor charges to a positive voltage. This voltage is a second control potential which is applied over a control line terminal 25 to energize or enable a utilization circuit such as, for example, the audio stages of the receiver to permit receipt of the message following the calling signals.

In order to insure that the decoder operates only upon the appearance of the two sequentially transmitted calling signals, and will not be inadvertently actuated in response to a noise signal, network 2 is positively disabled at all times except during a fixed timed interval after termination of the first calling signal. To this end, a switch-disabling network 4 is provided and applies a biasing voltage to switch 22 to maintain that switch in the non-conducting state at all times except the time interval after the first calling signal has terminated. The switch-disabling network consists of resistor 26 and capacitor 27 connected in series between the B+ supply voltage and ground. Capacitor 27 is normally charged to the B+ supply voltage with the polarity shown, and is connected to the input of switch 22. The voltage across capacitor 27 maintains the switch in the non-conducting (open) state, and prevents capacitor 23 from charging. A switch control circuit 5 controls network 4 to remove the bias voltage from switch 22 as soon as the proper first calling signal is received. When the switch-disabling network is subsequently placed in the operative state, a time delay is introduced before capacitor 27 charges sufficiently to drive switch 22 back into the non-conducting state. The fixed time-delay period is determined by the R-C time constant of resistor 26 and capacitor 27, and it is during this interval that network 2 is conditioned to produce a second control potential if the proper calling signal is received.

Switch control means 5 consists of a first normally non-conducting (open) switch element 30 coupled to the junction of resistor 17 and capacitor 16 in frequency-responsive network 1. Switch 30 provides a discharge path for capacitor 27 to inactivate switch-disabling network. Appearance of the first calling signal produces a control voltage across capacitor 16 which drives switch 30 into the closed or conducting state, discharging capacitor 27 and removing the bias voltage from switch 22. The network 5 also contains a further bias switch 31 connected in series with switch 30 and the B+ supply voltage to apply a biasing voltage to switch 22 during the interval that the first calling signal is present to prevent switch 22 from being driven into the conductive state, even though the switch-disabling network 4 has, in itself, been inactivated. Switch 31 is normally in the non-conducting (open) state and is actuated only during the time the first calling signal is present and switch 30 is conducting (closed). When switch 30 is driven into the conducting state by the first calling signal, bias switch 31 is driven into the conducting state and connects the B+ supply voltage to its output terminal 32, thereby applying a positive biasing voltage to the input of switch 22 and maintaining that switch in the non-conducting state for the duration of the first calling signal. Upon termination of this calling frequency, switch 30 returns to its normally non-conducting state, disabling bias switch 31 and removing the biasing voltage applied to switch 22 over lead 32. Switch 22 now conducts (is closed), thereby conditioning network 2 for the receipt of the second calling signal.

When switch 30 returns to the non-conducting (open) state at the end of the first calling signal, the short across capacitor 27 is removed and switch-disabling network 4 is no longer disabled. However, switch-disabling network 4, due to the time delay inherent in the R-C network 26–27, does not return to the operative state and disable switch 22 for a finite period of time after termination of the calling signal of the first frequency. If the second calling signal is received during this predetermined interval of time, reed 21 is driven into vibration establishing a conducting path through the reed and the switch 22 to charge capacitor 23 to the B+ voltage, producing a second control potential. The voltage at the control line output terminal 25 is now of the proper polarity and magnitude to actuate a utilization circuit such as the output stages of a receiver to condition the receiver for reception of a communication.

The manner in which the two-reed decoder illustrated in FIG. 1 functions may best be understood by considering a typical operational sequence. In the absence of any calling signal, it will be seen that both reed 11 and reed 21 are quiescent. No current flows in frequency-responsive network 1 and neither capacitor 13 nor capacitor 16 is charged. With no voltage across capacitor 16, switch 30 is in its normally non-conducting (open) state and has no effect on switch-disabling circuit 4. Capacitor 27 is, therefore, charged to the full B+ value, thereby maintaining switch 22 in the normally non-conducting (open) state. Frequency-responsive network 2 is, therefore, disabled, both because reed 21 has not been energized and because switch 22 is in the non-conducting state. Capacitor 23 does not charge, there is no control potential at terminal 25, and the receiver or remote station utilization network remains in the disabled state. It can be seen that even if a random noise burst including a frequency to which the reed 21 is resonant were to be received (or even one containing both reed frequencies), the frequency-responsive network 2 is not operative to charge capacitor 23 because switch 22 is in series with the capacitor 23 and the B+ supply voltage is maintained in the non-conducting state by switch-disabling network 4.

If a carrier signal is received which includes a first calling signal of the proper frequency, tuned reed 11 is driven into vibration, and the armature makes intermittent contact with its contact member and capacitor 13 charges to the B+ voltage through resistor 14. The voltage across capacitor 13 is connected to the input of switch 15 and maintains it in the non-conducting state to permit capacitor 16 to charge through resistor 17 and reed 11 to the B+ voltage. If the first calling signal persists for a sufficient period of time to permit capacitor 16 to charge up to the B+ voltage (indicating that a calling signal has actually been received and that the signal is not a noise burst), the control voltage from this first network appearing across capacitor 16 drives switch 30 into the conducting state and establishes a very low resistance discharge path for capacitor 27 in the disabling network. Capacitor 27 discharges rapidly, removing the biasing voltage applied to switch 22 by the switch-disabling network. However, when switch 30 is driven into the conducting state, it completes a circuit to ground for bias switch 31, driving it into the conducting state and connecting the B+ supply line to its output line 32 and thus to the input of switch 22; thereby maintaining switch 22 in the non-conducting state, even though the switch-disabling network 4 has been inactivated. This insures that switch 22 is enabled only after termination of the first calling signal.

At the end of the first calling signal, reed 11 ceases to vibrate and the charging path for capacitor is interrupted. Capacitor 13 now discharges through resistor 18. The time constant of capacitor 13 and resistor 18 is very short so that capacitor 13 discharges rapidly after the calling signal ends, removing the bias from switch 15. Switch 15 now conducts to discharge capacitor 16 removing the control voltage from the input of switch 30. Switch 30 becomes non-conducting, removing the short across capacitor 27 of the switch-disabling network and also removing the ground from bias-switch 31. The bias voltage holding switch 22 in the non-conducting state is removed and switch 22 conducts, thereby conditioning network 2 to receive the second calling signal. As pointed out previously, the R-C time constant of resistor 26 and capacitor 27 introduces a fixed time delay after termination of the first calling signal before switch-disabling network 4 again becomes operative to impress a disabling biasing voltage on switch 22. During this fixed time interval, network 2 is conditioned to receive the second calling signal and produce a control voltage at its output. If the second calling signal is received, reed 21 vibrates charging capacitor 23 through the now conducting switch element 22 and resistor 24. The voltage established across capacitor 23, as pointed out previously, is utilized as a control voltage to actuate the receiver, for example, to enable it to receive the following message.

If the second calling signal is not received during this time interval, switch-disabling network 4 again becomes operative to bias switch 22 into the non-conducting state, thereby interrupting the conducting path in network 2. The appearance of a noise burst, including the second frequency or even a calling signal of the proper frequency is no longer capable of charging capacitor 23 and "falsing" the decoder. By thus positively disabling the network containing the second reed, and conditioning it for operation only during a predetermined fixed time interval, the decoder operates only if the following events happen in a predetermined sequence:

(1) The calling signal of the first frequency is present for a sufficient period of time to charge capacitor 16 to the required level to actuate switch control means 5 and place switch-disabling means 4 in the inoperative state;

(2) The second calling signal must appear within a predetermined time period after termination of the first calling signal; and (3) The second calling signal persists long enough to charge capacitor 23 to a level such that the control voltage across capacitor is sufficient to actuate the utilization circuit.

Thus, by providing a two-tone decoder which does not transfer charge from one storage capacitor, controlled by the first reed, to a storage capacitor controlled by the second reed, the possibilities of noise falsing are minimized. Furthermore, positively disabling the electrical path containing the reed responsive to the second calling signal for all but the predetermined time period after termination of the first calling signal reduces the possibility that a noise burst, which contains both of these frequencies will actuate the decoder. Furthermore, the decoder is protected against falsing by a calling signal from a selective signalling system in which two frequencies are transmitted simultaneously to be followed by two additional frequencies. Should the decoder receives such a simultaneous calling signal containing both of the frequencies to which a particular decoder is to be responsive, the decoder will not respond and cause the receiver to be actuated falsely because the decoder logic requires that calling signals containing the two frequencies be received sequentially rather than simultaneously. Thus, even though only two reed devices are used, and only calling signals of two frequencies are transmitted to select a particular receiver out of a group of receivers, the decoder is secure against falsing and also highly reliable.

Figures 2, 3:
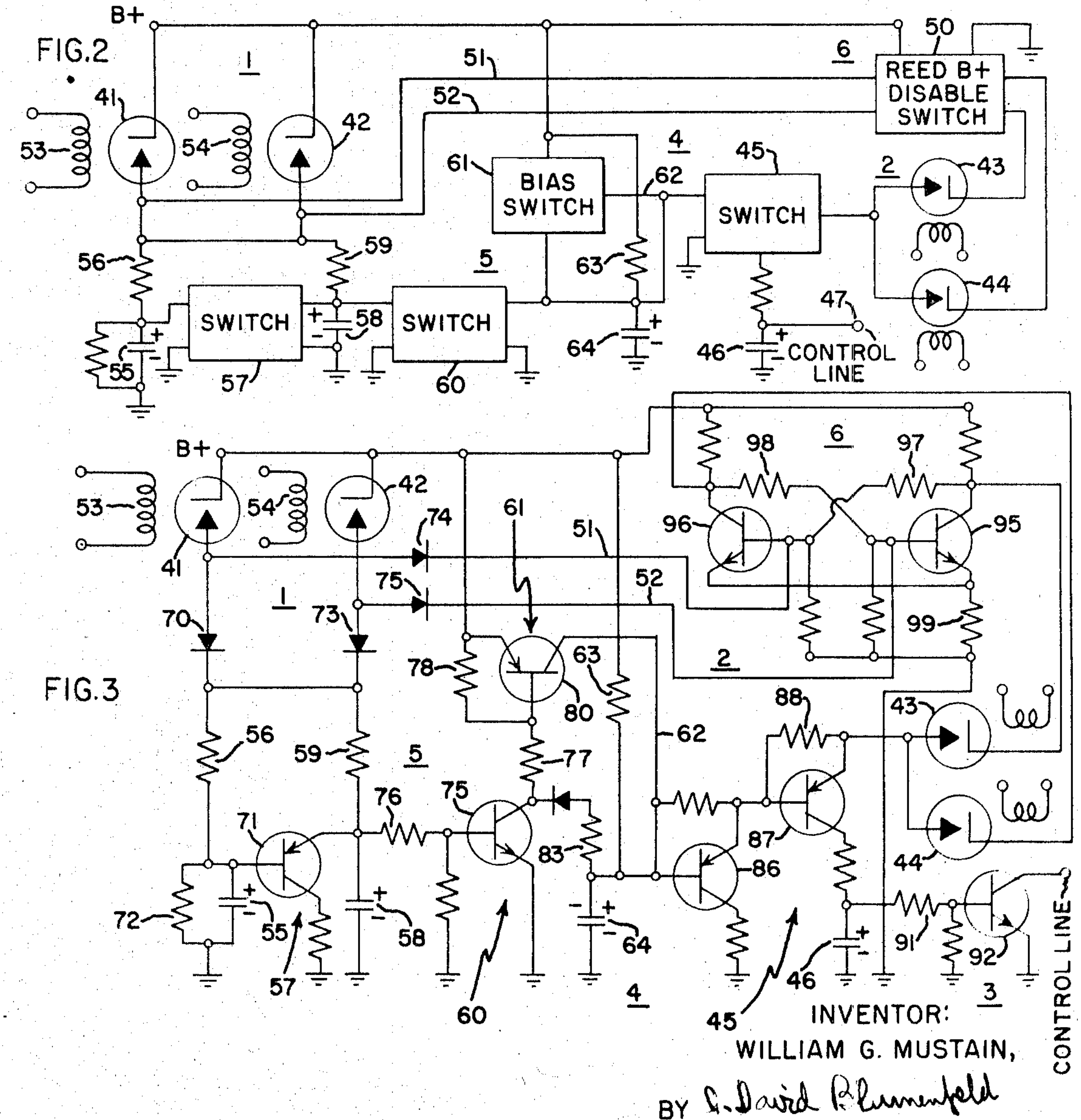
FIG. 2 is a partial block diagram of another such decoder which incorporates additional circuitry for providing an "all-call" function whereby a plurality of remote vehicles may be called simultaneously.
FIG. 3 is a schematic circuit diagram of the decoder of FIGS. 1 and 2.

FIG. 2 illustrates a decoder for a selective calling system which is similar in many ways to the decoder illustrated in FIG. 1 and described in connection therewith. The decoder of FIG. 2 differs only in the provision of an additional pair of frequency-sensitive reeds to provide an "all-call" or "group-call" function in the decoder. In the selective calling system and decoder as illustrated in FIG. 1, the receiver at each remote station contains a decoder with a pair of reeds which are responsive to a unique combination of calling signal frequencies which energize only one selected remote station. However, it may sometimes be desired to transmit a message which is of interest either to all of the vehicles or to some predetermined group of vehicles. In order to do so, a signal combination is transmitted which will actuate all or a selected group of remote stations or vehicles. To this end, an additional pair of reeds is incorporated in the decoder with calling signal frequencies common to all vehicles, or to a predetermined group. The calling signal frequencies assigned to this "all-call" or "group-call" frequency are unique in the sense that these frequencies are not utilized either individually or in any combination for the individual calling signals for a remote station. In order to insure that the presence of the additional reeds for a group or all-call function does not result in "falsing" of the decoder due to noise or vibration, the decoder of FIG. 2 contains a circuit for disabling the "all-call" responsive reed in the second frequency-responsive network when the station-call reed in the first network is excited by receipt of the station-calling signal and, conversely, for disabling the station-call reed in the second network when the first all-call or group-call signal frequency is received. The decoder of FIG. 2 again includes a first frequency-responsive network 1 which includes a pair of tuned reeds 41 and 42 which respond respectively to the first station-calling signal and the first "all-call" calling signal. Network 1 produces an output control voltage, either in response to the receipt of a first station-calling signal of the proper frequency or to the receipt of a first "all-call" calling signal of the proper frequency. The decoder also contains a second frequency-responsive network 2, which includes a pair of frequency-tuned reeds 43 and 44, which respond respectively to the second station-calling signal and the second "all-call" calling signal. Network 2 also includes a normally non-conducting switch 45, connected in series between the reeds and capacitor 46, so that a second control voltage is present at output control terminal 47 to actuate the receiver only if the signals are received in the proper sequence. As pointed out previously, the network 2 is controlled by a switch-disabling network 4 which maintains the switch 45 in the non-conducting state at all times except for a fixed interval after receipt of either the first station-calling signal or the first "all-call" calling signal. Switch control network 5 inactivates switch-disabling network 4 in response to the control voltage produced in response to the first station or "all-call" signal and simultaneously applies a biasing voltage to the switch 45 during the interval that the calling signal is present.

A reed disable switch circuit 6 is provided which is actuated in response to the energization of either reed 41 and 42 to ground the armature of either reed 43 or 44 to prevent accidental charging of capacitor 46 and falsing of the decoder. For example, if reed 41, tuned to the station-calling signal frequency, is energized, a positive voltage is applied to the red disable switch over lead 51. This positive voltage actuates switch element 50 which (acting as a double-pole, double-throw switch) grounds the armature of reed 44, which is associated with the "all-call" or "group-call" signal frequencies, thereby preventing capacitor 46 from charging to a positive voltage in the event that reed 44 is accidentally actuated. Similarly, if the first "all-call" calling signal is received to energize reed 42, a positive voltage is applied over leads 52 to switch 50, thereby connecting the armature of reed 43 to ground and the armature of reed 44 to the B+ terminal. In this fashion, upon receipt of a station-calling signal of a first frequency, the reed associated with the "all-call" frequencies in the second network is positively disabled and, conversely, upon receipt of the first of the "all-call" signal frequencies, the reed associated with the station calling frequencies in the second network is positively disabled. This minimizes or eliminates any possibility of decoder falsing due to the presence of the additional pair of reeds.

Tuned reeds 41 and 42 in the frequency-responsive network 1 each include windings 53 and 54, which receive the calling signals. The armatures of reeds 41 and 42 are connected in series with the B+ terminal of the voltage source, a capacitor 55, and a charging resistor 56. Capacitor 55, as previously explained, charges to the B+ voltage when either of these reeds is actuated for a sufficient period of time, and applies a biasing voltage to switch 57 to maintain the switch in the non-conducting state for the duration of first station or "all-call" calling signal. When reeds 41 and 42 vibrate, they also charge capacitor 58 through a charging resistor 59 to produce a first control voltage which actuates switching control network 5 to inactivate switch-disabling network 4. Switching network 5 contains a normally non-conducting switch 60 which is connected in shunt with a capacitor 64 forming part of the switch-disabling network. Switch 60, when driven into the conducting state, disables network 4 by discharging capacitor 64 and removing the biasing voltage supplied by the network. Switch 60, also actuates bias switch 61 which connects a bias voltage to switch 45 over its output lead 62, so that this switch 45 is maintained in the non-conducting state for the duration of the first calling signal, whether station or "all-call," even though the switch-disabling network 4 has been inactivated by switch 60.

The operation of the reed decoder illustrated in FIG. 2 is similar to that of FIG. 1 except for the function of the reed-disable switch network 6. Again, in the absence of either a first station or a first "all-call" calling signal network 2 is positively inhibited by disabling network 4, since the voltage across capacitor 64 maintains switch 45 in the non-conducting state so that accidental operation of either reeds 43 or 44 due to noise, shock, vibration, or other conditions, does not produce a control voltage across capacitor 46. Assuming now that a first station-calling signal is received and impressed on winding 53, the armature of reed 41 is driven into vibration and produces intermittent contact between the armature and the contact member. This establishes a conductive path between B+ and capacitors 55 and 58. The voltage on capacitor 55 biases discharge switch 57 into the non-conducting state to permit capacitor 58 to charge to a voltage level which drives switch 60 into the conductive state. Switch 60 then rapidly discharges capacitor 64 in the switch-disabling network 4, thereby removing the bias voltage which maintains switch 45 in the non-conducting state. However, switch 60 simultaneously actuates bias switch 61 so that a bias voltage is applied over lead 62 to maintain switch 45 in the non-conducting state, even though disabling network 4 is now not operative. Energization of tuned reed 41 by the station-calling signal also applies a positive voltage to reed-disable switch 50 over lead 51. Switch 50, as will be explained in detail with respect to the schematic circuit of FIG. 3, may be a bistable multivibrator which switches its conducting states in response to the voltages appearing on leads 51 and 52. In one conducting state (with voltage on lead 51), the B+ supply voltage is applied to the armature of reed 43, which is tuned to the second station-calling signal of the second frequency, and ground potential to the armature of reed 44 which is tuned to the second "all-call" calling signal. Thus, "all-call" reed 44 is positively disabled and a noise signal having a frequency which would throw this reed into vibration, for example, does not charge capacitor 46, since the closing of the armature and contact of reed 44 merely connects both plates of capacitor 46 to ground potential.

Upon termination of the first station-calling signal, capacitor 55 discharges rapidly through the shunt discharge resistor, causing switch 57 to conduct and discharge capacitor 58. The discharge of capacitor 58 removes the first control voltage from the input of switch 60, causing it to revert to its non-conducting state, de-energizing bias switch 61 and removing the bias voltage applied over lead 62 to the switch 45. Switch 45 now conducts and network 2 is now conditioned to receive the second station-calling signal to produce a control voltage across capacitor 46 to actuate the receiver in the vehicle. It may be noted that positive disabling of reed 44 prevents inadvertent actuation of the circuit due to noise, vibration, or the receipt of signals from a different selective calling system which may not assign the same signalling frequencies exclusively for "all-call", but may utilize them as part of the station-calling signals. If the second station-calling signal is not received during this time interval, network 2 is disabled as soon as the voltage across capacitor 64 reaches a sufficiently positive value to drive switch 45 into the nonconductive state interrupting the charging path for capacitor 46.

Similarly, if "all-call" calling signal is received initially, reed 42 in network 1 is energized and a positive voltage is applied over lead 52 to the reed disable switch 50. The switch now connects the positive voltage to the armature of "all-call" reed 44 and ground to the armature of station reed 43, thereby conditioning network 2 to respond only to the receipt of the second "all-call" calling signal.

FIG. 3 is a schematic circuit diagram of a preferred embodiment of the reed decoder illustrated in FIG. 2. The same numerals are used for corresponding elements to show the relationship between the schematic circuit diagram of FIG. 3 and the partial block diagram of FIG. 2. Network 1 for producing a first control voltage signal includes tuned reed 41, which responds to the first station-calling signal and a tuned reed 42, which responds to the first "all-call" calling signal as well as the associated windings 53 and 54. Reed 41 is connected in series with diode 70, charging resistor 56 to capacitor 55 and the B+ terminal of the supply voltage. Capacitor 55 is charged when reed 41 is excited by a station-calling signal of the proper frequency. Diode 70 is poled to prevent the actuation of one reed from applying a positive voltage to both transistors in switch 6. Actuation of reed 41 also charges capacitor 58 through resistor 59 to produce the control voltage which actuates switch control circuit 5.

A normally non-conducting transistor switch (in the absence of a calling signal it is actually de-energized because it has no emitter bias) is connected between capacitor 55 and capacitor 58 and acts as a discharge path for capacitor 58 upon termination of the first station or "all-call" calling signals. The switch consists of a PNP transistor 71, having a base connected to the junction of capacitor 55 and charging resistor 56, an emitter connected to the junction of capacitor 58 and charging resistor 59, and a collector connected through a suitable collector-resistor to ground. The collector-emitter path of transistor 71 is connected in shunt with capacitor 58 so that when transistor 71 is switched into the conducting state, the resistance of the collector-emitter path of the transistor and of the collector-resistor is sufficiently low to permit rapid discharge of capacitor 58 to ground. In the absence of any calling signal, transistor 71 is not conducting and, in fact, is de-energized since the emitter is not connected to any source of potential. Upon the appearance of either of the calling signals, capacitor 58 charges up to the B+ voltage, applying a positive potential to the emitter of transistor 71. However, capacitor 55 is also charged up to the same B+ voltage, so that the emitter and the base of the transistor are at the same potential and the transistor remains in the non-conducting state. Upon termination of the calling signal, capacitor 55 discharges through shunt resistor 72 so that base voltage drops towards ground until the base-emitter junction of the transistor is forward-biased, driving the transistor into saturation and discharging capacitor 58 through the collector-emitter path of the transistor. The R-C time constant of resistor 72 and capacitor 55 is made quite small so that transistor 71 is driven rapidly into saturation after the termination of the calling signal and capacitor 58 is quickly discharged.

Network 1 also contains a second tuned reed 42, which is responsive to the first "all-call" calling signal for charging capacitor 58 and producing a first control voltage in response to an "all-call" or "group-call" signal. Reed 42 is also connected in series between the B+ supply voltage and capacitors 55 and 58 through a diode 73. Thus, upon receiving the first "all-call" calling signal, capacitors 55 and 58 are charged and produce a first control voltage which actuates the switching network 5 connected to capacitor 58.

The contact elements of each of reeds 41 and 42 are connected to reed disable switch 6 respectively over leads 51 and 52, and suitably poled diodes 74 and 75. The anodes of diodes 74 and 75 are connected to the reed contact elements so that they become conductive when the reed vibrates and applies a positive voltage to the diodes. This positive voltage controls reed-disable switch network 6 to apply the B+ voltage to one of the reeds in network 2 and ground potential to the remaining reed. The reed disable switch which will be described in detail subsequently, consists of a bistable transistor multivibrator with the armatures of the reeds in the network being connected to the collectors of the transistors forming the multivibrator. As each of these transistors are driven into conduction, the voltage at the collector of the conducting transistor drops to ground potential, whereas the voltage at the collector of the non-conducting transistor remains approximately at the B+ level. In this fashion, the B+ or ground potential is selectively applied to the reeds in network 2, depending on which of the reeds 41 and 42 in network 1 is energized by the first calling signal.

Switch control network 5 consists of a pair of transistor switches 60 and 61 which are controlled in response to the control voltage appearing across capacitor 58, which is charged whenever either reed 41 or reed 42 is driven into vibration by a suitable calling signal. Normally non-conducting switch 60 consists of an NPN transistor 75, the base of which is connected through a suitable resistor 76 to capacitor 58. The emitter of transistor 75 is connected directly to ground, and its collector is connected through resistors 77 and 78 to the B+ terminal. Bias switch 61 consists of a PNP transistor 80, the emitter of which is connected directly to the B+ supply source, and the base of which is connected through resistor 77 to the collector of transistor 75. The collector of transistor 80 is connected through lead 62 to the input of a switch element 45, forming part of network 2. In the absence of any calling signal, the base and emitter of transistor 75 are at the same potential and, hence, the transistor is in its non-conducting state. With the transistor in the non-conducting state, the resistance of a collector-emitter path of this transistor is very high, so that the major part of the voltage drop between B+ and ground occurs across the collector-emitter path and the collector is approximately at B+. As a result, the base and emitter electrodes of bias switch transistor 80 are substantially at the same potential and transistor 80 is also in the non-conducting state. Upon the appearance of a control voltage at the output of network 1, i.e., when capacitor 58 charges substantially to the B+ voltage in response to a calling signal which actuates either reed 41 or 42, the base-emitter junction of transistor 75 is forward-biased and transistor 75 is driven into saturation. The resistance of its emitter-collector path is so low that the collector of transistor 75 now drops essentially to ground potential. As soon as the potential at the collector of transistor 75 drops to ground, the base-emitter junction of transistor 80 is forward-biased, driving that transistor into saturation so that the collector of transistor 80 is now essentially at the B+ voltage. This positive voltage is applied over lead 62 to switch 45 to maintain the switch in the non-conducting state for the duration of the first calling signal. Transistor 75 also inactivates switch-disabling circuit 4 by discharging capacitor 64. The collector-emitter path of transistor 75 is connected in shunt with capacitor 64 and discharges it through current-limiting resistor 83 and a diode 84, connected between the collector of transistor 75 and the junction of capacitor 64 and a charging resistor 63. The cathode of diode 84 is connected to the collector so that the diode is biased into conduction only when transistor 75 is driven into the saturated state and its collector is at ground potential. When that occurs, diode 84 is biased into conduction and capacitor 61 discharges through the diode and the collector-emitter path of transistor 75.

Switch-disabling network 4, as well as the output line 62 from bias switch 61, controls the switch 45 connected in series with reeds 43 and 44, charging capacitor 46 and the B+ terminal in frequency-responsive network 2. Switch 45 consists of a pair of PNP transistors 86 and 87, connected in tandem. PNP transistor 86 has its base connected to the junction of capacitor 64 and resistor 63 in the switch-disabling circuit 4 and its collector connected through a suitable resistor to ground. The emitter of transistor 86 is connected to the base of transistor 87 and through a resistor 88 to the contact elements of the reeds 43 and 44. Output lead 62 from the bias switch transistor 80 is also connected to the base of the PNP transistor 86. It can be seen that with the switch-disabling network operative and capacitor 61 charged to the B+ voltage, the base of PNP transistor 86 is more positive than its emitter and the transistor is in the non-conducting state. As long as transistor 86 is in the non-conducting state, the base of transistor 87 is at the same potential or more positive than the emitter, and transistor 87 is also maintained in the non-conducting state. With transistor 87 in the non-conducting state, its emitter-collector path resistance is so high that the charging time constant for charging capacitor 46 is sufficiently long that a noise burst at the frequency of either reed 43 or 44 and even a calling signal at one of their frequencies will not charge up capacitor 46 sufficiently to actuate the output circuit illustrated generally at 3. Only if transistor 87 is driven into conduction does the resistance of the charging path for capacitor 46 drop to a low enough value to permit the capacitor to charge up to the proper voltage level to actuate output circuit 3.

The contacts of reeds 43 and 44 are both connected to the emitter of transistor 87 with their armatures being connected through the switch element 6 either to the B+ supply source or to ground potential. Thus, it can be seen that the collector-emitter path of transistor 87 is in the charging path for capacitor 46, and network 2 is conditioned to charge capacitor 46 and produce the second control voltage only if the transistor 87 is conducting and one of the reed elements 43 or 44 is driven into vibration by the receipt of a suitable calling signal.

A utilization control circuit 3 is connected to the junction of capacitor 46 and charging resistor 89 and consists of an NPN transistor connected through a suitable current-limiting resistor 91 to capacitor 46 so that the appearance of the second control potential across capacitor 46 drives the transistor into the conducting state and actuates the utilization circuit connected to the output terminal 47 of the circuit. NPN transistor 92 has its emitter connected directly to ground and its base to the junction of capacitor 46 and resistor 89 through the current-limiting resistor 91. The collector of transistor 92 is connected to the output terminal 47 and, thence, through a suitable source of negative supply voltage. A leakage resistor 93 is also connected between the base of the transistor and ground, so that in the absence of a control potential across the capacitor 46, the base and emitter of the transistor are at the same potential and the transistor is in the non-conducting state. Whenever network 2 is actuated in response to the termination of the proper first station or "all-call" calling signal, then the proper second station or "all-call" calling signal is received to charge capacitor 46, the base-emitter junction of transistor 92 becomes forward-biased driving that transistor into saturation and applying an output voltage to terminal 47 which is of the proper polarity and magnitude to enable the audio output stages of a radio receiver.

It will be apparent that transistors 86 and 87 remain in the non-conducting state and network 2 is disabled as long as the disabling circuit is operative and a positive voltage appears across capacitor 64. Furthermore, even when switch-disabling circuit 4 is driven into the inoperative state by the action of control switching circuit 5, transistor 86 remains in the non-conducting state by virtue of the positive bias applied to its base through the bias-switching transistor 80 and lead 62. Only after termination of the first calling signal are switches 60 and 61 in the switch-control network 5 disabled removing the positive bias on lead 62 and driving transistor 86 into the conductive state. Transistor 87 now conducts, conditioning network 2 to charge capacitor 46 upon receipt of a proper second calling signal. Transistors 86 and 87 remain in the conducting state until capacitor 64 again charges to a sufficiently positive voltage to reverse-bias the base-emitter junction of transistor 86, thereby driving transistor 86 and, consequently, transistor 87 into the non-conducting state. The time constant of the R-C network in switch-disabling network 4 is made sufficiently large so that the time delay before the network again becomes operative is greater than the normal time interval between the end of the first calling signal and the receipt of the second calling signal and its duration.

As was pointed out previously, in order to insure that the decoder does not inadvertently false due to a noise burst, which is likely to throw one of the two tuned reeds in network 2 into vibration, the reed disable switch is provided to ground one of the reeds whenever the first station or "all-call" signal is received. By thus grounding one of these reeds, inadvertent operation or falsing cannot occur, even if the reed is thrown into vibration, since the armature of the reed is at ground potential and capacitor 46, one plate of which is already at ground, cannot charge.

Reed disable switch 6 includes a bistable multivibrator consisting of a pair of cross-coupled NPN transistors 95 and 96, the collectors of which are connected through suitable resistors to the B+ supply terminal. The collector of each of the transistors is connected to the base of the opposite transistor through coupling resistors 97 and 98, whereas their emitters are connected through a common emitter-resistor 99 to ground. The bases of the transistors are also grounded through suitable base resistors. The armatures of reeds 43 and 44 are connected respectively to the collectors of transistors 95 and 96, so that they are either at the B+ potential or ground, depending on which of the transistors is conducting. NPN transistors 95 and 96 are, as may be seen by observation, connected as a bistable multivibrator which is characterized by the fact that one transistor is conducting and the other non-conducting, and that they remain in that condition until the application of a positive voltage to the base of the non-conducting transistor. The transistors then reverse their conductive states and remain in the new states until the occurrence of the next positive input to their bases. It will also be apparent that the collector of the conducting transistor is essentially at ground or very close thereto, while the collector of the non-conducting transistor is at B+, or very close thereto. Hence, depending on which of these two transistors is conducting, the armature of one of the reeds is at B+ and the armature of the other lead is grounded and, thence, disabled.

The conducting states of transistors 95 and 96 in the bistable multivibrator are controlled by tuned reeds 41 and 42 in frequncy-responsive network 1 of the decoder so that actuation of one of these reeds results in the disabling of one of the reeds in the second network. The sequence of operation is always such that if the reed representative of the station-calling signal is actuated in the first path, the reed representative of the "all-call" calling signal frequency is disabled in the second path and, conversely, actuation of the "all-call" reed in network 1 results in the disabling of the station call reed in network 2.

The operation of the reed disable switch 6 may perhaps best be understood as follows:

Assume that transistor 96 is conducting, transistor 95 is cut off, and that neither a station nor an "all-call" calling signal is being received. With transistor 96 conducting, its collector is essentially at ground, while the collector of transistor 95, which is non-conducting, is essentially at B+. Further assume that reeds 41 and 43 are responsive to the station-calling signals, whereas the reeds 42 and 44 are responsive to the "all-call" calling signals. With the transistors in the reed disable switch in the state described, the armature of "all-call" reed 44 is shorted to ground, and the armature of station-identification reed 43 is connected to the B+ potential. If, now, a first station-identification calling signal is received, to which reed 41 responds, a positive potential is applied to diode 74 and over lead 51 to the base of transistor 96. This positive potential has no effect, however, since NPN transistor 96 is already in the conducting state. The bistable multivibrator remains in its original state with transistor 96 conducting and transistor 95 cut off. This means that "all-call" reed 44 in the second network is disabled, whereas station call reed 43 is connected to the B+ terminal. This will allow the decoder to function properly and allow reed 43 to charge capacitor 46 if the second station-calling signal is received in the proper time sequence. If "all-call" reed 44 in the second network is accidentally driven into vibration, it has no effect on the decoder since its armature is grounded and capacitor 46 cannot charge.

If, on the other hand, a first "all-call" calling signal is received to drive reed 42 into vibration, a positive voltage applied to the base of transistor 95 through diode 75 and lead 52 now drives the base-emitter junction of this non-conducting transistor positive, initiating current flow through the collector-emitter path. This current flow reduces the voltage at its collector, and this negative-going voltage is transmitted through coupling resistor 97 to the base of conducting transistor 96, reducing current flow through transistor 96 causing the collector of the transistor to rise from ground to a slightly more positive potential. This positive-going potential is, then, coupled through resistor 98 to the base of transistor 95, causing it to conduct further until in a very short time the conducting state of the two transistors are switched with transistor 95 now conducting fully and transistor 96 in a non-conducting state. With the reversal of conducting states, the armature of station reed 43, which is connected to the collector of transistor 95, is now at ground potential, whereas the armature of "all-call" reed 44 is now at the B+ potential. Reed 44 can now charge capacitor 46 if the second "all-call" calling signal is received in the proper time sequence. Station reed 43, on the other hand, is shorted to ground and disabled and is now incapable of charging capacitor 46 and actuating the utilization circuit.

Conversely, if the state of the bistable multivibrator prior to the arrival of the first calling signal had been reversed, i.e., with transistor 95 in the conducting state and transistor 96 in the non-conducting state, a similar sequence of events occurs. If the first calling signal is a station-calling signal of a frequency to throw reed 41 into vibration, a positive voltage is applied through the reed to diode 74 and lead 51 to the base of non-conducting transistor 96, causing the multivibrator to reverse its state and driving transistor 96 into conduction and transistor 95 into non-conduction. The collector at transistor 96 now drops essentially to ground potential, thereby shorting the "all-call" reed 44 in the second path to ground while the armature of station reed 43 is connected to the B+ potential at the collector of non-conducting transistor 95.

Similarly, with transistor 95 conducting and transistor 96 cut off, arrival of an "all-call" signal first causes reed 42 to vibrate and a positive potential is applied through diode 75 and lead 52 to the base of conducting transistor 95. Since this transistor is conducting, the positive voltage has no effect. Reed 43, identified with the station-calling signals, remains shorted to ground and the armature of "all-call" reed 44 is at the B+ supply voltage, so that the capacitor 46 may be charged to actuate utilization circuit 3 upon receipt of the second "all-call" calling signal. It may be seen, therefore, that the reed-disable multivibrator switch 6 positively disables one of the reeds in the second conducting path whenever one of the reeds in the first path is actuated to thereby minimize or eliminate any possibility of the falsing of the decoder due to action of the additional reeds.

It will now be appreciated that a reed decoder for selective signalling systems has been provided which is highly reliable and safe against falsing of the decoder, while yet utilizing only two sequential calling signals and two identification reeds associated with each station. Furthermore, an "all-call" function has been provided by the addition of two other reeds which are positively controlled in such a manner as to minimize or eliminate any possibility of falsing due to the presence of the additional reeds.

While a number of particular embodiments of this invention have been shown, it will, of course, be understood that the invention is not limited thereto, since many modifications, both in the circuit arrangement and in the instrumentalities employed, may be made. It is contemplated by the appended claims to cover any such modifications as fall within the true spirit and scope of this invention.

What is claimed as new and desired to be secured by Letters Patent of the United States is:

1. A decoder for providing a utilization signal in response to a first signal of a first frequency followed by a second signal of a second frequency, said decoder comprising:

(a) a source of operating potential;

(b) a first frequency-responsive switch connected to said potential source, said first switch being normally open and said first switch closing in response to a signal of a first frequency;

(c) a first timing circuit connected to said first frequency-responsive switch, said first timing circuit normally producing a first disabling signal and producing an initiating signal in response to closure of said first switch for a first selected time duration;

(d) a bias circuit connected to said first timing circuit, said bias circuit producing a second enabling signal in response to said first disabling signal and producing a second disabling signal in response to said initiating signal;

(e) a second timing circuit connected to said first timing circuit, said second timing circuit producing a third disabling signal in response to said first disabling signal and producing a third enabling signal in response to and for a second selected time duration after receipt of said initiating signal;

(f) a second frequency-responsive switch connected to said potential source, said second switch being normally open and said second switch closing in response to a signal of a second frequency;

(g) an output terminal; and (h) output means connected between said second switch and said output terminal, said output means also being connected to said bias circuit and to said second timing circuit for supplying a utilization signal to said output terminal when said second switch is closed and in response to the presence of both said second and said third enabling signals, and for removing said utilization signal from said output terminal in response to either one of said second and third disabling signals.

2. The decoder of claim 1 and further comprising a third frequency-responsive switch connected in parallel with said first frequency-responsive switch, a fourth frequency-responsive switch connected in parallel with said second frequency-responsive switch, and means connecting said first and third frequency-responsive switches to said second and fourth frequency-responsive switches for disabling said fourth frequency-responsive switch in response to closure of said first frequency-responsive switch and for disabling said second frequency-responsive switch in response to closure of said third frequency-responsive switch.

3. The decoder of claim 1 wherein said output means comprise a transistor having its emitter-collector path connected between said second frequency-responsive switch and said output terminal, and having its base connected to said bias circuit and to said second timing circuit.

4. The decoder of claim 1 wherein said bias circuit comprises a transistor having its emitter-collector path connected between said potential source and said output means and having its base connected to said first timing circuit, and wherein said second timing circuit comprises a resistor and capacitor connected to said potential source and to said output means.

5. The decoder of claim 4 wherein said output means comprise a transistor having its emitter-collector path connected between said second frequency-responsive switch and said output terminal, and having its base connected to said emitter-collector path of said bias circuit transistor and to said capacitor of said second timing circuit.

6. The decoder of claim 5 and further comprising a third frequency-responsive switch connected in parallel with said first frequency-responsive switch, a fourth frequency-responsive switch connected in parallel with said second frequency-responsive switch, and means connecting said first and third frequency-responsive switches to said second and fourth frequency-responsive switches for disabling said fourth frequency-responsive switch in response to closure of said first frequency-responsive switch and for disabling said second frequency-responsive switch in response to closure of said third frequency-responsive switch.

References Cited

UNITED STATES PATENTS

| | | | |
|---|---|---|---|
| 3,175,192 | 3/1965 | Keltner | 340—171X |
| 3,403,381 | 9/1968 | Haner | 340—167X |
| 3,447,133 | 5/1969 | Cole et al. | 340—171 |
| 3,465,294 | 9/1969 | Carsello et al. | 340—167X |

HAROLD I. PITTS, Primary Examiner

U.S. Cl. X.R.

340—164, 167